May 29, 1945.  H. S. EBERHARD  2,376,864
SEAL
Filed Sept. 12, 1941
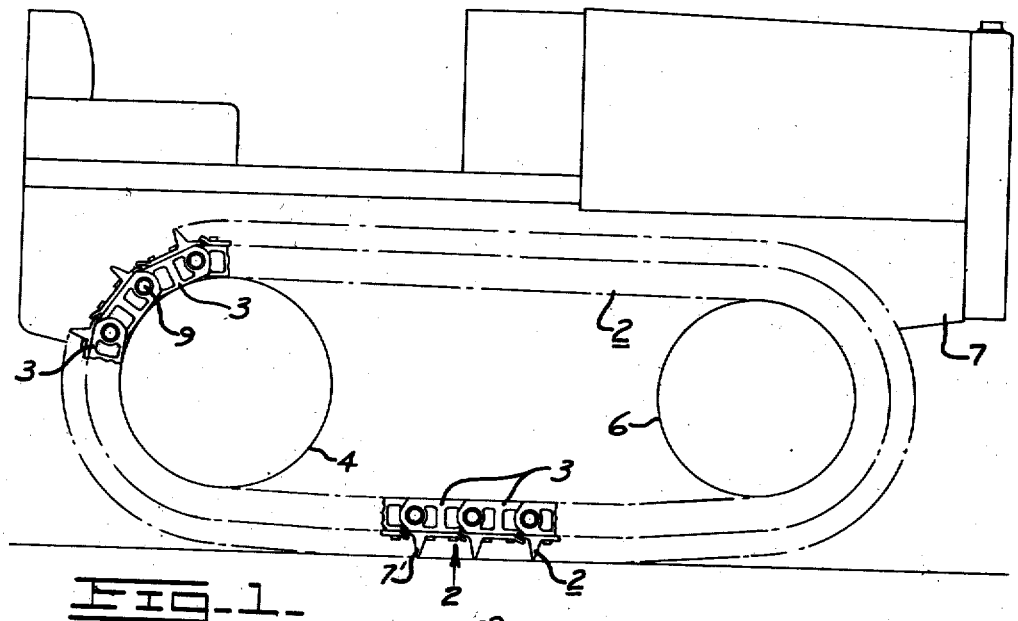
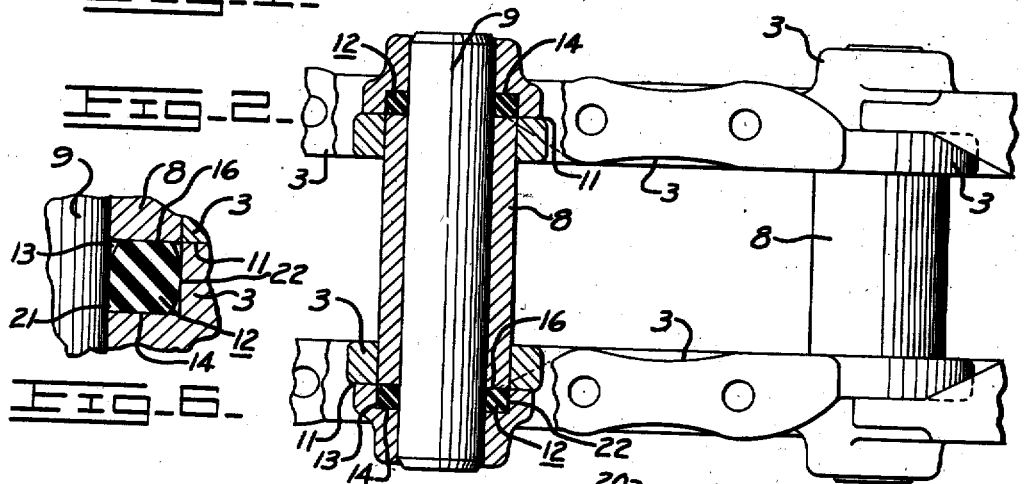
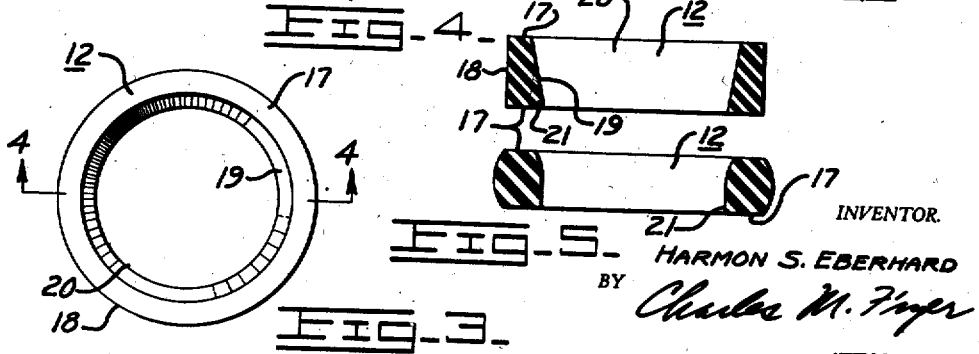
INVENTOR.
HARMON S. EBERHARD
BY Charles M. Fryer
ATTORNEY.

Patented May 29, 1945

2,376,864

UNITED STATES PATENT OFFICE 2,376,864

SEAL

Harmon S. Eberhard, Peoria, Ill., assignor to Caterpillar Tractor Co., San Leandro, Calif., a corporation of California Application September 12, 1941, Serial No. 410,637

8 Claims. (Cl. 305—10)

My invention relates to seals, and more particularly to a seal adapted for positioning in a space between surfaces or members which have limited relative movement therebetween, such as between adjacent overlapped pivotally connected track links of an endless track for a track-type tractor or the like.

In the case of endless track mechanisms frequently called upon to operate in mud, dirt and dusty atmospheres, the entrance of foreign material between a shaft or pin and a bushing journalled about such pin, which provide a common type of connection for pivotally connecting overlapped link ends, causes abrasion between these parts. This results in excessive wear which may cause premature breakdown of the track mechanism, and consequently frequent replacements may be necessary. Even if such replacements may not be necessary, the wear may necessitate frequent adjustments of the track mechanism, because of change in the pitch of such track mechanism, which occurs as play develops between the track pins and bushings. This problem is particularly bothersome because of the limited space which exists in a track mechanism for housing suitable means for sealing off the space or joint between adjacent overlapped pivotally connected link ends.

My invention is designed to obviate the above described difficulties, and has as its objects, among others, the provision of improved sealing means which is compact and will, therefore, occupy a minimum space, is of economical construction and easy to assemble, will have a relatively long life, and which is particularly adapted for sealing in environments of the character related. Other objects of my invention will become apparent from a perusal of the following description thereof.

In general, the seal of my invention comprises a substantially solid mass of a deformable resilient material capable of assuming substantially its original shape after release of stress thereon, and which is adapted to be compressed between opposite surfaces on members or parts having limited relative movement therebetween. Because the seal is under a stressed condition when compressed between such surfaces, it will be maintained in tight frictional engagement therewith to preclude passage of foreign material therepast; and because of its resiliency, the seal will permit such limited relative movement while maintaining the frictional engagement with such surfaces. In sealing the space between pivotally connected overlapping link ends of an endless track mechanism, so as to preclude entrance of foreign material between the previously described pin and bushing, the seal of my invention is compressed between an end of the bushing and a surface on a link opposite such bushing; the seal being housed within a recess in such opposite link.

Reference is now made to the drawing for a more detailed description of my invention, in which:

Fig. 1 is a more or less schematic side elevational view of a track-type tractor including its endless track.

Fig. 2 is a fragmentary bottom elevational view, partly in section and looking in the direction of arrow 2 in Fig. 1, of a portion of the endless track mechanism; the track shoes appearing in Fig. 1 being omitted from the view to illustrate the construction more clearly.

Fig. 3 is an enlarged end elevational view of the seal of my invention, in its unstressed condition.

Fig. 4 is a sectional view of such seal taken in a plane indicated by line 4—4 in Fig. 3.

Fig. 5 is a view similar to Fig. 4 illustrating the shape which the seal assumes when it is compressed in operating position.

Fig. 6 is an enlarged fragmentary sectional view of the seal structure shown in Fig. 2.

As was previously related, the seal of my invention has great applicability in sealing off the joint or space between adjacent overlapping, pivotally connected link ends of an endless track mechanism for a track-type tractor or the like; and I, consequently, describe the seal in such environment, for purposes of illustration. However, a seal embodying the principles of my invention may be employed to seal the space or joint between any parts which have a limited degree of relative movement therebetween, such as between adjacent pivotally connected links of an endless chain, or even between parts which are not pivotally connected.

With reference to Fig. 1, the endless track mechanism 2, which comprises a plurality of pivotally connected links 3, passes over final drive sprocket 4 and front idler 6 of tractor 7. As such links turn about sprocket 4 and front idler 6 during travel of the machine, limited turning or rotational movement occurs between adjacent overlapping links, as can be readily seen from the links illustrated as passing over sprocket 4 in Fig. 1. Usually, the endless track is formed of spaced chains of links, as can be seen from Fig. 2; and track rollers (not shown) are usually provided to ride over rails formed on one edge of such links, while track shoes 7' are generally secured to the opposite edges of the links.

The pivotal connection between the overlapping ends of adjacent links 3 comprises bushing 8 rigidly and immovably secured in a suitable aperture formed in an inner one of the overlapped link ends, such as by a press fit in such aperture, and a pin or shaft 9 which extends through bushing 8, being journalled therein, and which is rigidly and immovably secured in a suitable aperture in the outer one of the overlapped link ends, also usually by a press fit connection. Thus, relative turning or rotational movement can occur between the overlapping links. Entrance of foreign material through the relatively small space or joint 11 between the overlapped link ends, results in such material working between bushing 8 and shaft 9, causing premature wear between such parts. To seal such space and preclude entrance of dirt between the bushing and the shaft, I provide a seal in the form of ring 12 composed of a substantially solid mass of any suitable resilient and deformable material capable of assuming substantially its original shape when stress applied thereto within the limits of elasticity of the material, is released.

Such ring 12 is housed within a counterbore or recess 13 formed in the outer overlapped link end, about shaft 9, and which has inner wall or surface 14 opposite bushing end 16. The opposite ends 17 of ring 12 are preferably flat or planar; and in the unstressed condition of the ring, such ends are spaced apart a distance greater than the distance between link surface 14 and bushing end surface 16. As a result, when the seal ring is positioned about shaft 9 and axially compressed between surfaces 14 and 16 in the assembled construction, it will become deformed so as to exert sufficient internal pressure to maintain its ends 17 in substantially tight frictional engagement with surfaces 14 and 16, to preclude passage of foreign material therepast, and hence seal the journal between bushing 8 and shaft 9 against entrance of foreign material. At the same time, the resiliency of ring 12 will permit the limited relative turning movement to obtain between surfaces 14 and 16 as the links turn about the axis of shaft 9 when they pass over sprocket 4 and idler 6. Such limited turning movement is relatively slight; and consequently, it will not stress ring 12 beyond the limits of elasticity. As a result, I believe that ends 17 are maintained in immovable contact with surfaces 14 and 16. However, even should there be some slippage, such slippage is so slight as not to cause excessive wear on ring ends 17, thus making for long life of the seal.

Any suitable material which is sufficiently resilient or elastic and sufficiently oil and moisture proof may be employed as the material for ring 12. Rubber, or any of the numerous oil and moisture proof vulcanized rubber compositions, including rubber and fillers such as fabric, are suitable. Also, synthetic rubber, or synthetic rubber compositions may be employed.

Ring 12 may be of any desirable shape, but in the environment illustrated, I prefer the shape shown in Figs. 3 and 4 (illustrating the unstressed condition of the ring) wherein the outer peripheral surface 18 of the ring is concentric with the axis of the ring, and the inner peripheral surface 19 tapers so as to be non-parallel to surface 18, thus rendering one end surface 17 of the ring wider than the opposite end surface thereof. The diameter of ring aperture 20 adjacent the wider end 17, is preferably substantially that of the diameter of shaft 9; and the ring is preferably assembled in recess 14 so that wider end 17 thereof engages wall 14, and the narrower end 17 engages bushing end 16.

As a result of the preferred shape, deformation of ring 12 when it is compressed between surfaces 14 and 16 will cause outward bulging of the inner peripheral corner portion 21 adjacent wider end 17, so that such portion will be in frictional engagement with shaft 9 for a substantial distance along the length of the shaft, to enhance the efficacy of the seal. In this connection, recess 13 is of such diameter that its surface or wall 22 concentric with or surrounding shaft 9 will become frictionally engaged by a portion of the outer periphery of ring 12 when it is compressed between surfaces 14 and 16, thus further enhancing the efficacy of the seal.

Because the seal of my invention is composed of a solid mass of material, and does not embody a plurality of spring thrust parts, it can be made very small. This is extremely advantageous where sealing is required in a limited space, such as exists in the described environment. Any suitable method may be employed for assembling the seal in position. For example, it may be first positioned in recess 13, and then the links, bushing and shaft may be connected in the usual manner. If desired, however, the seal may be placed over shaft 9 after connection of bushing 8 to the inner link ends and passage of the shaft through the bushing, and then the outer link ends may be connected to the projecting ends of shaft 9, which results in proper reception of the seal in recess 13.

I claim:

1. In mechanism having a pair of members adapted to have limited relative turning movement therebetween about the axis of a shaft, one of said members having a recess about said shaft, each of said members having a surface extending transversely to the axis of the shaft and which is spaced from and opposite the surface on the other member, a sealing ring of deformable resilient material positioned about said shaft in said recess and having end surfaces which in the unstressed condition of said ring are spaced apart a distance greater than the distance between said member surfaces, said ring being deformed by being axially compressed between said member surfaces with said end surfaces in substantially immovable frictional engagement with said member surfaces for maintaining sealing contact with said member surfaces while allowing said limited relative movement, the deformation of said ring resulting in the outer peripheral surface of said ring being in sealing engagement with a wall of said recess surrounding said shaft and the inner peripheral surface of said ring being in sealing engagement with said shaft.

2. In mechanism having a pair of members adapted to have limited relative turning movement therebetween about the axis of a shaft, one of said members having a recess about said shaft, each of said members having a surface spaced from and opposite the surface on the other member, a sealing ring of deformable resilient material positioned about said shaft in said recess and having end surfaces which in the unstressed condition of said ring are spaced apart a distance greater than the distance between said member surfaces, said ring being deformed by being compressed between said member surfaces with said end surfaces in frictional engagement with said member surfaces for maintaining sealing contact with said member surfaces while allowing said limited relative movement, the deformation of said ring resulting in the outer peripheral surface of said ring being in sealing engagement with a wall of said recess surrounding said shaft and the inner peripheral surface of said ring being in sealing engagement with said shaft, said inner peripheral surface being tapered in the unstressed condition of said ring whereby one end of said ring is wider than the other.

3. In an endless track or the like construction comprising a pair of overlapping links, and means pivotally connecting said links for turning movement about an axis including a bushing secured to one of said links and a shaft extending through said bushing and secured to the other of said links, the link to which the shaft is secured having a recess about said shaft opposite an end of said bushing; sealing means comprising a ring of deformable resilient material positioned about said shaft in said recess, said ring being deformed by being axially compressed between a surface on said end of said bushing which extends transversely with respect to said axis and a surface on a wall of said recess opposite said bushing which also extends transversely with respect to said axis, the ring being in frictional engagement with said bushing end surface and said recess wall surface whereby entrance of foreign material between said bushing and shaft is precluded.

4. In an endless track or the like construction comprising a pair of overlapping links, and means pivotally connecting said links including a bushing secured to one of said links and a shaft extending through said bushing and secured to the other of said links, the link to which the shaft is secured having a recess about said shaft opposite an end of said bushing; sealing means comprising a ring of deformable resilient material positioned about said shaft in said recess and having flat end surfaces which in the unstressed condition of said ring are spaced apart a distance greater than the distance between said bushing end and a wall of said recess opposite said bushing end, said ring being deformed by being axially compressed between said bushing end and said recess wall with said flat surfaces in frictional engagement with said bushing end and said recess wall for maintaining sealing contact therewith while allowing limited pivotal movement between said links, the deformation of said ring resulting in a portion of the outer peripheral surface of said ring being in sealing engagement with a wall of said recess surrounding said shaft and a portion of the inner peripheral surface of said ring being in sealing engagement with said shaft.

5. A seal adapted for positioning about a shaft in a space between surfaces adapted to have limited relative movement therebetween, comprising a ring of deformable resilient rubber material adapted to be axially compressed between said surfaces and having flat end surfaces, an outer peripheral surface substantially concentric with the axis of said ring, and a tapered inner peripheral surface whereby one end surface of said ring is wider than the other.

6. In mechanism having adjacent members pivotally connected together for limited turning movement about an axis, each of the members having a surface extending transversely to said axis and which is spaced from and opposite the surface on the other member, a sealing ring of deformable resilient material about said axis in the space between said surfaces and having end surfaces which in the unstressed condition of the ring are spaced apart a distance greater than the distance between said member surfaces, said ring being deformed by being axially compressed between said member surfaces with its end surfaces in substantially immovable frictional engagement with said member surfaces for maintaining sealing contact with said member surfaces while said limited relative movement occurs.

7. An endless track or the like construction comprising parts pivotally connected together for limited relative turning movement about an axis, each of such parts having a surface extending transversely with respect to said axis with one of said members having a recess about the axis, and sealing means between said transversely extending surfaces within the recess comprising a mass of deformable resilient material compressed in the direction of said axis, deformed between said transversely extending surfaces so as to frictionally engage said parts and maintain sealing contact with said parts while allowing said relative movement and said sealing means being restricted in its deformation into contact with said transversely extending surfaces so as to be confined entirely within the recess.

8. An endless track or the like construction comprising overlapping links, means pivotally connecting said links for limited turning movement about an axis including a bushing in one of the links, a shaft in the other of said links and extending through the bushing, a recess being provided between a surface on an end of the bushing which extends transversely with respect to said axis, and a surface on the link opposite such bushing end which also extends transversely with respect to said axis, a sealing ring of deformable resilient material about the shaft in said recess having one end frictionally engaged with said end surface on said link opposite said bushing end, and said ring being deformed by being axially compressed between said bushing end surface, said surface on said opposite link whereby its ends are maintained in sealing contact while said limited relative movement occurs and said sealing means being restricted in its deformation into contact with the bushing end surface and the surface on said opposite link so as to be confined entirely within the recess.

HARMON S. EBERHARD.